(12) United States Patent  (10) Patent No.: US 8,788,409 B1
Souza  (45) Date of Patent: Jul. 22, 2014

(54) ENHANCING INCOME USING LINE OF CREDIT SWEEP ACCOUNT

(76) Inventor: Tanisha Souza, Honolulu, HI (US)

(*) Notice: Subject to any disclaimer, the term of this patent is extended or adjusted under 35 U.S.C. 154(b) by 390 days.

(21) Appl. No.: 12/796,171

(22) Filed: Jun. 8, 2010

(51) Int. Cl.
*G06Q 40/00* (2012.01)
*G06Q 20/40* (2012.01)
*G06Q 20/10* (2012.01)
*G06Q 40/02* (2012.01)

(52) U.S. Cl.
CPC .............. *G06Q 20/40* (2013.01); *G06Q 40/00* (2013.01); *G06Q 20/10* (2013.01); *G06Q 40/02* (2013.01)
USPC .............................................. 705/39; 705/38

(58) Field of Classification Search
CPC ....... G06Q 20/40; G06Q 40/00; G06Q 20/10; G06Q 40/02
USPC ..................................................... 705/38, 39
See application file for complete search history.

(56) References Cited

U.S. PATENT DOCUMENTS

| | | | |
|---|---|---|---|
| 6,799,167 B1 | 9/2004 | Gullen et al. | |
| 7,117,172 B1 | 10/2006 | Black | |
| 7,124,105 B2 | 10/2006 | Hilton | |
| 7,502,758 B2 | 3/2009 | Burke | |
| 7,509,286 B1 | 3/2009 | Bent et al. | |
| 7,519,551 B2 | 4/2009 | Bent et al. | |
| 7,640,199 B1 | 12/2009 | Hyland | |
| 7,680,734 B1 * | 3/2010 | Bent et al. | 705/40 |
| 7,748,614 B2 * | 7/2010 | Brown | 235/379 |
| 2002/0091637 A1 | 7/2002 | Bent et al. | |
| 2003/0023544 A1 * | 1/2003 | Chodes | 705/38 |
| 2004/0143524 A1 | 7/2004 | Hilton | |
| 2004/0153400 A1 | 8/2004 | Burke | |
| 2005/0211765 A1 * | 9/2005 | Brown et al. | 235/379 |
| 2008/0005021 A1 * | 1/2008 | Brown et al. | 705/40 |
| 2008/0046361 A2 | 2/2008 | Bent et al. | |
| 2008/0288398 A1 | 11/2008 | Maricondi | |
| 2009/0048954 A1 | 2/2009 | Blackburn et al. | |
| 2009/0150283 A2 | 6/2009 | Bent et al. | |
| 2009/0150284 A1 | 6/2009 | Burke | |
| 2009/0164350 A1 | 6/2009 | Sorbe et al. | |
| 2009/0164351 A1 | 6/2009 | Sorbe et al. | |
| 2009/0164370 A1 | 6/2009 | Sorbe et al. | |
| 2010/0030686 A1 | 2/2010 | Lee et al. | |

* cited by examiner

*Primary Examiner* — Daniel Felten
(74) *Attorney, Agent, or Firm* — David Pressman (57) ABSTRACT

A system and method for providing predictable income leverages income and excess cash flow into alternative income sources through linking a checking account to a revolving line of credit (L/C) and sweeping money back and forth between the L/C and the checking account. The system and method are automated using a computer running a software program.

19 Claims, 4 Drawing Sheets

ENHANCING INCOME USING LINE OF CREDIT SWEEP ACCOUNT

PRIOR ART

Many ways of managing capital are known. The following is a list of patents that cover some known ways that presently appear relevant:

| U.S. Pat. or Pub. No. | Kind Code | Issue or Pub. Date | Patentee or Applicant |
|---|---|---|---|
| 6,799,167 | B1 | Sep. 28, 2004 | Gullen et al. |
| 7,117,172 | B1 | Oct. 03, 2006 | Black |
| 7,124,105 | B2 | Oct. 17, 2006 | Hilton |
| 7,502,758 | B2 | Mar. 10, 2009 | Burke |
| 7,509,286 | B1 | Mar. 24, 2009 | Bent et al. |
| 7,519,551 | B2 | Apr. 14, 2009 | Bent et al. |
| 7,640,199 | B1 | Dec. 29, 2009 | Hyland |
| 20020091637 | A1 | Jul. 11, 2002 | Bent et al. |
| 20040143524 | A1 | Jul. 22, 2004 | Hilton |
| 20040153400 | A1 | Aug. 05, 2004 | Burke |
| 20080046361 | A2 | Feb. 21, 2008 | Bent et al. |
| 20080288398 | A1 | Nov. 20, 2008 | Maricondi |
| 20090048954 | A1 | Feb. 19, 2009 | Blackburn et al. |
| 20090150283 | A2 | Jun. 11, 2009 | Bent et al. |
| 20090150284 | A1 | Jun. 11, 2009 | Burke |
| 20090164350 | A1 | Jun. 25, 2009 | Sorbe et al. |
| 20090164351 | A1 | Jun. 25, 2009 | Sorbe et al. |
| 20090164370 | A1 | Jun. 25, 2009 | Sorbe et al. |
| 20100030686 | A1 | Feb. 04, 2010 | Lee et al. |

BACKGROUND

Gullen et al. teach the use of a benchmark portfolio that is customizable to an investment portfolio so that the benchmark portfolio tracks investment changes made by an investor over time.

Black's system receives events, such as account transactions, and converts them into messages which in turn invoke rules. After all rules have executed, the account is updated, such as projecting the account. His system runs in real time as transactions arrive.

Hilton teaches a genetic algorithm that determines a plan for payment of obligations from a finance account. The algorithm operates to satisfy certain objectives, including maximizing the minimum daily cash on hand in the finance account. An optimal vector data structure is selected that represents a plan for payment of payment obligations that most nearly satisfies one or more objectives.

In his patent and application, Burke accumulates credits from financial movements to and from accounts held by a financial transactor. Entries in an account are periodically accessed and rounded up. A total roundup amount is withdrawn from the account and the account is debited with the roundup amount.

In their '286 patent, Bent et al. teach a system and method for managing accounts of clients at customer financial entities so that deposits of up to $100,000 or greater are insured, so that interest income earned on account balances may be flexibly allocated according to customer instructions, and so that withdrawals are not limited. To do this, client funds are held in insured, interest-earning money market deposit accounts at one or more banks or savings institutions. This is done by receiving client transaction information, determining a net transfer of funds into or out of each client account, causing transfer of funds from the insured, interest-bearing accounts to match the net transfer of funds into or out of each client account, and allocating interest earned by the deposit accounts to clients according to customer instructions.

In their '361 application and their '551 patent, Bent et al. manage a plurality of client demand accounts to allow a banking institution to retain client deposits on the bank's balance sheets while providing the client with the capability of implementing an unlimited number of transactions per month while receiving interest on their account balances. This is done by transferring funds from individual client accounts into a pooled, insured, interest-bearing deposit account. On a regular basis, a net transaction is calculated as the sum of individual client deposits and withdrawals from the plurality of demand accounts. This calculation determines the amount of funds that need to be deposited into the pooled deposit account to cover client deposits, or an amount of funds that needs to be withdrawn from the pooled deposit account to cover client withdrawals. Individual account management calculations are performed to determine whether to deposit or withdraw funds from the pooled account to each individual client demand account. Funds can be deposited into a demand account from various sources via different instruments.

In their '283 application, Bent et al. teach a system for managing a plurality of demand accounts for multiple clients by holding client funds at one or more banking institutions in one or more single insured deposit accounts that provides interest while permitting unlimited withdrawals and, from the viewpoint of the investor, removes the $100,000 limitation of FDIC insurance for the individual investor.

Maricondi teaches a brokerage system that provides cash sweep account products and services within a single platform.

Blackburn et al. teach methods, apparatus, and software for sub-accounting for an omnibus account.

In their applications, Sorbe et al. teach a system for allocating prioritized payments from automatic deposits destined for a customer account. The deposit is credited to the customer account and relatively instantaneously any prioritized payment is debited from the customer account. The customer account can be a prepaid card account or demand deposit account so that a customer has effective access on the prepaid card only to a net value of funds.

Lee et al. teach a retirement fund management module that is linked to a bank customer's retail bank account. The retirement fund module can be configured to transfer a predetermined amount of retirement funds into the bank account according to rules selected by the bank customer.

The above prior-art systems and methods are concerned basically with management, allocation, protection, and distribution of funds, but do not describe any income generating scheme that most can use without excessive difficulty.

SUMMARY

I have discovered a system and method that provides predictable income through an automated system for the leveraging of income and excess cash flow into alternative income sources by linking a checking account to a revolving line of credit (L/C) and sweeping money back and forth between accounts. My system permits individuals to supplement their incomes or retire without fear of depleting their savings or running out of money.

PREFERRED EMBODIMENT

Figure 1:
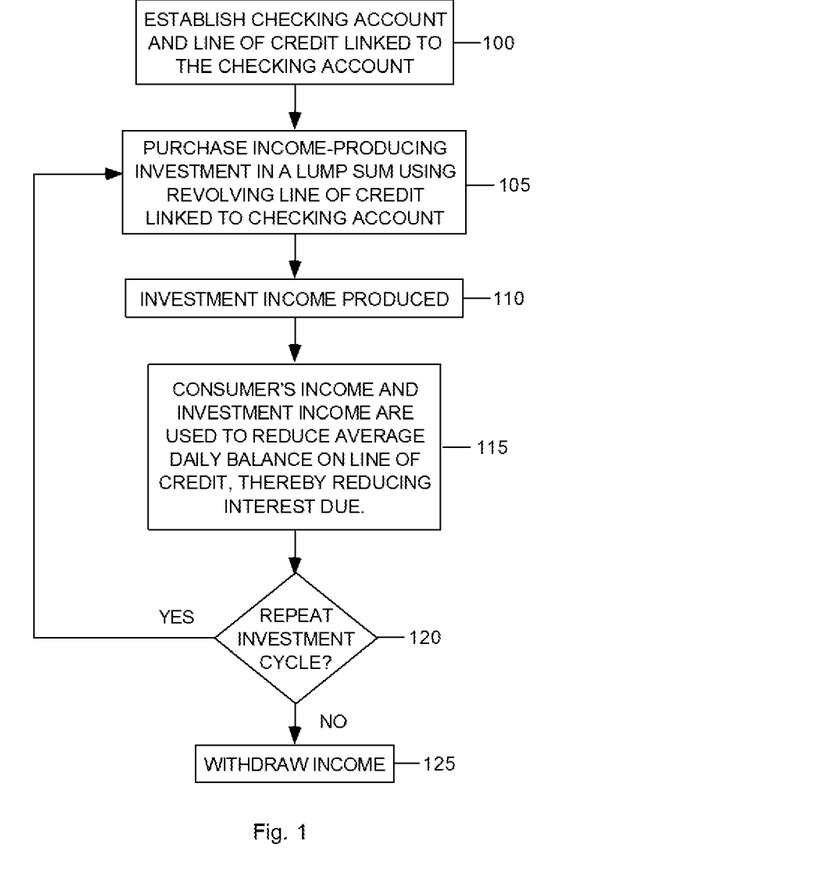
FIG. 1 is a flow chart showing some basic operations of an income generating method according to one aspect of one embodiment.

Description—FIG. 1

FIG. 1 shows the steps to be taken according to one aspect of the one embodiment.

An investor who wishes to obtain enhanced income first obtains a checking account and a line-of-credit (L/C) linked to the checking account, step 100.

Next, step 105, an income-producing investment is purchased in a lump sum with proceeds from the L/C account. This results in the investor owing a balance to the provider of the L/C.

The investment produces income, step 110.

The investment income from the income-producing investment and the investor's other income are combined and swept to the L/C to minimize the average daily balance on the L/C, thereby reducing the amount of interest due and the total amount owing, step 115.

The investor's income is applied against the L/C as long as possible throughout the month. To facilitate this, the investor may charge a large portion of their living expenses on a separate revolving credit card so that the bulk of their income is used to minimize the average daily balance on the L/C for most of the month. This allows the investor to "float" a significant portion of their living expenses on the credit card up to 30 days following the billing cycle. When bills are due, cash is swept from the L/C back into the checking account to pay bills as late as possible during the month. Any excess cash for the month remains against the balance on the line of credit. (While the present system is described using a monthly cycle, the investor may use any other time period that is available or that the investor may choose, so any other period may be substituted for the term "monthly").

The next month, the new investment income from the income-producing investment and the investor's other income or cash flow are combined again and swept to the L/C balance to minimize the average daily balance on the L/C, thereby reducing the amount of interest due and the total amount owing. The cycle repeats until the L/C is completely repaid.

At this point, the investor can repeat the investment cycle, step 120, or withdraw some or all of the income, step 125.

For a simple, one-time investment, the investor may keep track of cash flow with a handwritten or computer-based spreadsheet. However for a serious investor with multiple investments, or an investor who wishes to use the system to project the date he can stop working, replace a certain amount of income, or pay off debt, such record keeping would be onerous and would be best managed by a computer program that can incorporate a personal budgeting component or an account aggregator component so the investor can track their daily progress toward their investment income or debt reduction goals. The investor can see on a daily basis how changes in income, expenses, large purchases, interest rates or investment performance would impact the date they were projected to be debt-free or reach a pre-determined investment income level. Such a program can run with equal ease on a small personal computer or a mainframe. Two algorithmic examples follow. The first example is for an investor who wishes to try my method once with the option of continuing with additional investments at the end. A suitable computer program algorithm is shown in the flow chart of FIG. 2, which mirrors the steps discussed for FIG. 1.

Figure 2:
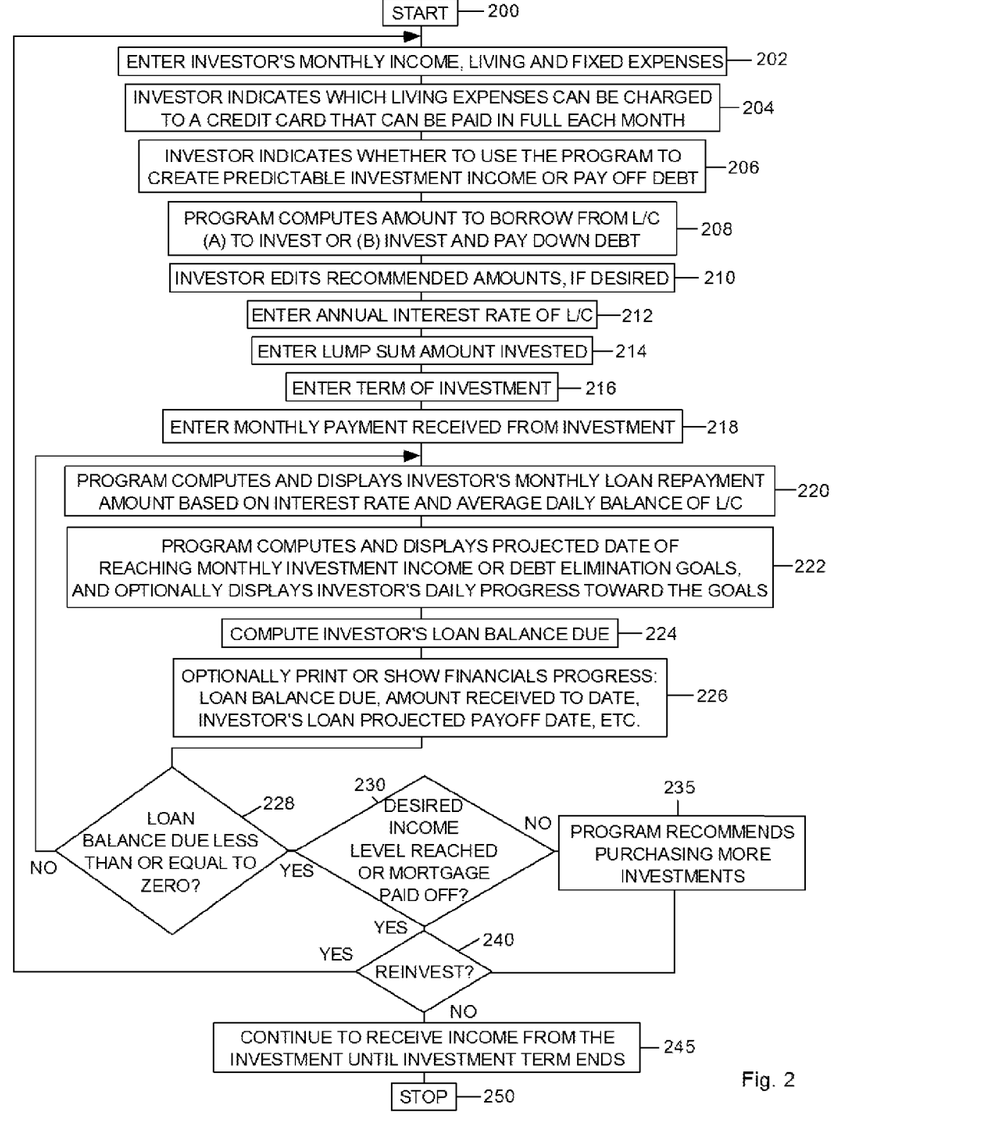
FIG. 2 is an algorithmic programming flow chart showing the steps in operation of a first version of the above embodiment in which an investor tries the method of FIG. 1 with the option of continuing with additional investments at the end.
Figure 3:
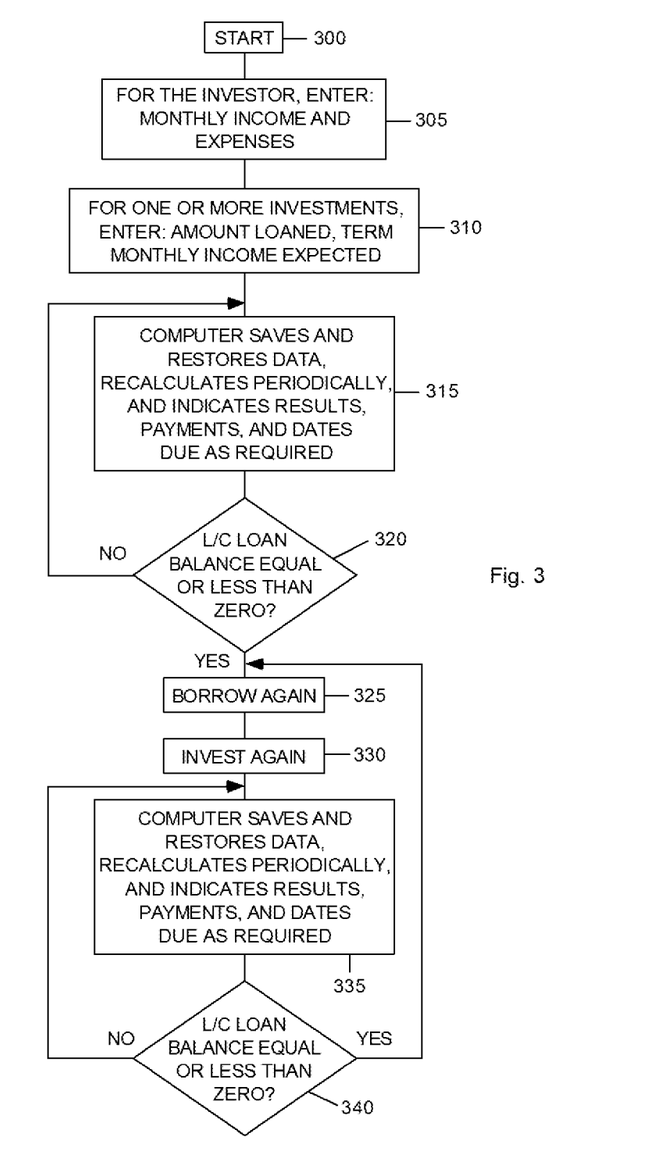
FIG. 3 is an algorithmic programming flow chart showing the steps in operation of a second version of the above embodiment in which investor borrows more than once, loans to or invests more than once with one or a plurality of entities, and loans or reinvests more than once to or with one or a plurality of entities.

—Operation—FIGS. 2 and 3

In the examples below, it is assumed that the investor has previously obtained a L/C account linked with a checking account, as described in connection with FIG. 1.

Example A

FIG. 2

Premise: The investor will borrow once, invest that money into one or a plurality of entities, rapidly repay the L/C using all of their income and investment income, and have the option to either take all the net gains or reinvest using the L/C.

After the program is started, step 200, the computer instructs the investor to enter various items of information. At the end of each entry, the investor signals the computer by pressing the "Enter" key or another predetermined key or clicks a mouse to indicate that the data are ready for entry into the program and to cause the program to advance to the next step.

After each entry, the investor can signal the computer using a keystroke or other indication that they want to edit some of the information previously entered. If the edits change the outcome of any calculations, the computations are repeated so that results are current. Either periodically or each time a value is changed, all values that have been entered and the results of all calculations are saved, typically on a hard disk or in flash memory. That way the program can be stopped and then restarted at a later time with no loss of information. This is well known and commonly done in computer programs.

The computer first instructs the investor to enter their monthly income and expenses, assets and liabilities, or alternatively it may collect the data through an account aggregator, i.e., a service that provides this information, step 202.

Next, the investor indicates to the program which living expenses can be charged to a credit card that can be paid in full each month, step 204. The program queries whether the investor wishes to use the program to create predictable investment income or to pay off debt, step 206. At this point, the user may enter the percentage to allot to income or debt, if desired.

Based on that information and the amount of the investor's excess cash flow, the program recommends that the investor borrow and invest a specific amount from a revolving L/C. In the case of an investor who uses the program to eliminate debt, it also recommends using a portion of the L/C to pay down debt in a lump sum and a portion to invest, step 208.

The investor can either choose the amount that the computer recommends borrowing from the L/C, or can choose a different amount, step 210.

The program next instructs the investor to enter the annual interest rate of the L/C, step 212.

Also it asks for the lump sum amount invested to be entered, step 214.

Next it asks for the term of the investment, step 216.

Finally it asks for the monthly payment received from the investment, step 218.

From this, the program computes and displays the investor's monthly loan repayment amount, step 220.

From the above information, the program also computes the investor's projected date of reaching the monthly investment income or debt elimination goals, and can optionally print or display the investor's daily progress toward their goals, step 222.

Next, the program computes the investor's loan balance due, step 224.

The program can also optionally print or show progress of the financials, i.e., loan balance due, amount received to date, projected loan payoff date, etc., step 226.

Next the program checks to see if the loan balance due is less than or equal to zero, step 228.

When the L/C balance is not near zero, program control returns to step 220 and steps 220 through 226 are repeated again.

If the loan balance is zero or near-zero, the computer determines if the investor's desired income level has been reached or the mortgage or other debt has been paid off, step 230.

If the desired income level hasn't been reached, or the debt hasn't been paid off, then the computer recommends purchasing more of the same investment(s) or other investment(s) in a lump sum using the L/C until the desired income level will be achieved or the mortgage or other debt is paid off, step 235.

The investor can then decide to reinvest and/or pay off debt as the program recommends or not, step 240.

If the investor decides to reinvest, he or she so notifies the program and the program continues control of the program returns to step 202.

If the investor decides not to reinvest, they will continue to receive income until the investment term ends, step 245.

Thereafter the program stops, step 250.

Example B

FIG. 3

The following algorithmic programming example is an extension of the program discussed above in Example A. It can perform all the same steps as above and in addition can perform new steps.

Premise: The investor will borrow more than once, loan more than once to one or a plurality of entities, and reinvest more than once in one or a plurality of entities.

To provide an example with realistic figures to facilitate understanding, assume that an investor's income is $5,000 per month, their expenses are $3,500 a month, and their monthly uncommitted cash flow is $1,500 per month. The investor secures a L/C from their savings bank of $10,000. The investor loans this amount to a creditworthy entity for three years at an interest rate of 7.5%. The entity repays $311 per month to the investor in principal and interest. The investor's cash flow of $1,500 is combined with the $311 in principal and interest to obtain a monthly cash flow of $1,811. The $1,811 cash flow is used to repay the $10,000 loan in 5.5 months. Thereafter the investor is still receiving the $311 in principal and interest from the first loan and has completely repaid the $10,000 that they borrowed from the savings bank.

At the end of the 5.5 months, the investor again loans the principal amount ($10,000) from the L/C to a creditworthy entity for three years at an interest rate of 7.5%. The entity repays $311 per month in principal and interest. The investor combines his or her cash flow of $1,500 with the $311 in principal and interest from the first loan, and the $311 in principal and interest from the second loan to pay down the L/C in monthly amounts of $2,122 over a period of 4.7 months.

Another similar transaction will pay down the L/C at a rate of $2,433 per month over a period of four months.

In three years, the investor will have assets in the form of notes valued at approximately $110,000 and a monthly income of $3,732. This amount will depend on the interest rate charged. A nominal rate of 7.5% was assumed in this example.

Thus by borrowing $10,000 from the L/C, investing it by loaning it to a creditworthy entity that pays principal and interest of $311 per month, combining this amount with uncommitted cash flow of $1,500, paying the L/C down as much as possible, and reinvesting each time, the L/C is paid off and the investor reaps a very large reward. At the end of three years, with only $1,500 per month out-of-pocket the investor has notes worth about $110,000 and a monthly income of $3,732. This practice is very different from prior-art methods of management, allocation, protection, and distribution of funds.

In algorithmic programming form, the above events occur as follows. It is assumed that each entry can be edited at will and the program will automatically recalculate all results that follow from any changes.

At the start of the program, step 300 (FIG. 3), the investor enters into the program their monthly income and expenses, box 305.

For one or more investments the investor enters the amount loaned, the term, and the monthly income expected, step 310.

Next, the computer program saves and restores data, periodically recalculates all financial values, and indicates results, payments to be made and received, and dates due, as required, step 315.

The computer then checks to see if the loan balance on the L/C is less than or equal to zero, step 320.

If not, program control returns to step 315.

If so, the first borrow-loan cycle is complete and the program indicates to the investor, via any humanly sensible means (monitor, printer, sound, etc.), that it is time to borrow from the L/C again, step 325.

The investor may then invest again, step 330.

The program in the computer again periodically performs and reports the financial calculations to the investor, step 335, and checks to see if the L/C loan balance is less than or equal to zero.

If not, program control returns to the saving and calculation step 335.

If so, program control returns to step 325 and the investor borrows again.

After the initial cycle (steps 305-320 and subsequent cycles (steps 325-340)) will pay down the L/C more rapidly with each cycle. Each time the L/C is paid down, a new cycle is started. A plurality of subsequent investment cycles thus operate simultaneously.

The investment cycle can continue indefinitely, amounts borrowed or loaned can be increased or decreased, profits can be taken, or the investor can sell out. The investor can receive some or all instructions from the program, i.e., make a L/C payment, reinvest, etc. Alternatively, the program can perform some or all functions including banking, sweeping, loaning, investing, tracking, and reporting. The investor will know on a daily basis how the investment's performance is affecting progress toward the investor's goals. The program can also tell how long the investment income will last and project if and when the investor's monthly investment income will increase or decrease. The program can project if and when the income becomes self-sustaining, such as at which point the investor can live entirely off a portion of the investment income and repeated reinvestment of the income will enable the asset base to continue to grow.

Although the above algorithms are exemplary, there are many other possibilities. Instead of an investor managing their own money, a broker can be used. Instead of borrowing and investing the same amount each time, the program may recommend changing the size of the L/C to increase the velocity of repaying the L/C. Instead of relying on a single type of investment, risk can be spread among other types of investments. Instead of the investor or broker choosing the investments, the program can choose and recommend one or more investments from a pool of investments that are likely to improve the investor's results toward his goals.

In the above examples, an advantage is gained by paying living expenses as late as possible and paying down the line of credit balance as early as possible each month.

The size of the investor's available cash flow, the investor's loan, and the investment are predetermined to be of amounts that will enable full repayment of the investor's loan prior to the end of the entity's loan term. Otherwise, the sequence of operations amounts only to a simple loan to the entity.

Computer System

Figure 4:
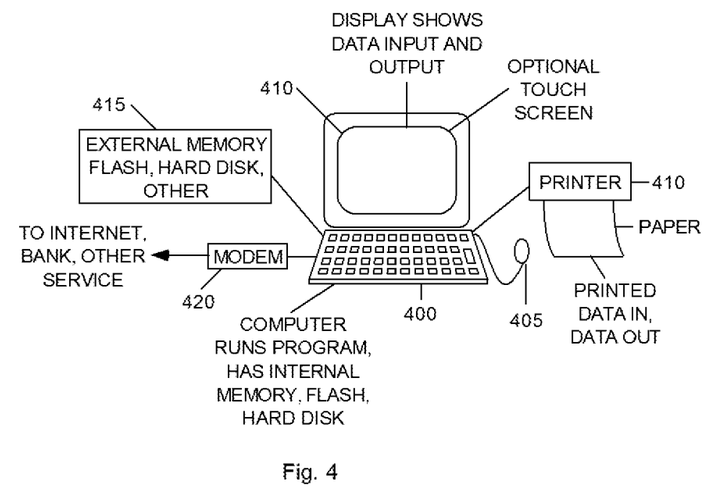
FIG. 4 is a block diagram of a computer system according to the one embodiment.

FIG. 4 shows a computer system capable of running a program containing the above algorithms. A computer 400 has an pointing device such as a mouse 405, a display 410, an internal memory (not shown) such as a hard disk, flash memory, a Read Only Memory (ROM), and a Random Access (read and write) Memory (RAM). The computer runs a program that implements the flow chart of the embodiment of FIG. 2 or FIG. 3. Display 410 is optionally a touch screen display and can show all data entered into computer 400 and query the user for information. An optional printer 410 receives data from computer 400 so as to print financial data and the like that has been entered into or computed by computer 400. An optional external memory 415 stores data for backup and portability of the information stored by the program operating in computer 400. A modem 420 connects computer 400 to external resources such as the bank where the line of credit is established, and to other services such as financial managers and the like.

CONCLUSION, RAMIFICATIONS, AND SCOPE

Accordingly the reader will see that, according to one or more aspects, I have provided a method and apparatus for sweeping funds between a checking account and a line of credit in order to invest in a way that provides predictable monthly income.

While the above description contains many specificities, these should not be construed as limitations on the scope, but as exemplifications of some presently preferred embodiments.

Many other ramifications and variations are possible within the teachings. For example, all aspects of the preferred embodiment are scalable to any size and to handle any volume of funds. The computer and program can be used as a bookkeeping device, or can operate autonomously through connection to a banking system. A significant added benefit provided by my method is improved credit rating for the investor. One factor considered in credit ratings is the management of debt. Debts incurred against the line of credit are rapidly repaid. Over time, the amount borrowed and repaid from the line of credit increases, yet is promptly repaid. Thus the investor successfully manages debt in larger and larger amounts, thereby improving their credit rating. In lieu of a checking account, any other type of withdrawal-on-demand account may be used. As stated the monthly cycle referred to in the examples can be changed to any other suitable term and the amounts can be smaller or larger than those given. The computer used to implement the system can be a local computer in the investor's facility or a central server at a location remote from the investor that serves a plurality of investors.

Thus the scope should be determined by the appended claims and their legal equivalents, and not only by the examples given.

The invention claimed is:

1. A method for an investor to generate a predictable income, where said investor has living expenses and a first income having a net value greater than said investor's living expenses, comprising:
   providing a computer having a memory,
   entering into said memory of said computer said first income of said investor,
   obtaining a revolving line-of-credit account from a lender with the ability to supply funds, wherein said lender charges interest at a predetermined rate on the average daily balance of funds withdrawn from said revolving line-of-credit account,
   obtaining a withdrawal-on-demand or checking account,
   obtaining a lump sum from said line-of-credit account and purchasing an income-producing investment with said lump sum from said revolving line-of-credit account, said income producing investment arranged to produce a second income,
   entering said lump sum into said memory of said computer,
   said computer being arranged to combine said first and said second incomes into a combined income,
   said computer also being arranged to direct a sweep of said combined income into said revolving line-of-credit account at predetermined intervals in order to minimize said average daily balance in said revolving line-of-credit account, thereby reducing the amount of interest due and the total amount owing in said revolving line-of-credit account,
   said computer further being arranged to direct said living expenses to be paid periodically each month by directing a sweep of sufficient of said funds in said revolving line-of-credit account into said withdrawal-on-demand or checking account for paying said living expenses, thereby minimizing said average daily balance of funds withdrawn from said revolving line-of-credit account and reducing the amount of said interest owed,
   whereby said first and said second incomes are used to pay down said revolving line-of-credit account while said living expenses are withdrawn from said revolving line-of-credit account and then paid in order to minimize said average daily balance in said revolving line-of-credit account and said amount of said interest paid.

2. The method of claim 1, further including:
   obtaining a credit card account having no interest charges when paid in full each month,
   charging a portion of said living expenses to said credit card account in order to leave as much of said funds in said balance of said funds in said line-of-credit account,
   paying said credit card account in full each month,
   whereby said portion of said living expenses are floated on said credit card account, thereby reducing said daily balance of said line-of-credit account and said amount of said interest paid.

3. The method of claim 2 wherein said computer is arranged to pay said credit card account as late as possible in each month in order to maximize said funds in said balance of said funds in said line-of-credit account, thereby reducing as much as possible said balance of said line-of-credit account and said amount of said interest paid.

4. The method of claim 1 wherein said investor is selected from the group consisting of individual investors and financial managers.

5. The method of claim 1 wherein at least one of said combining, said sweeping of said combined income into said line-of-credit account, said sweeping of said funds into said checking account, and said paying of said living expenses is automated by said computer.

6. The method of claim 1, further including purchasing an additional investment with funds from said line-of-credit account after said line-of-credit is paid down.

7. The method of claim 1, further including arranging said computer to compute and display said investor's monthly loan repayment amount based on said interest rate and average daily balance of said line-of-credit.

8. The method of claim 1, further including arranging said computer to display said investor's projected date of reaching monthly investment income or debt elimination goals.

9. The method of claim 8, further including arranging said computer to display said investor's daily progress toward said investment income or said debt elimination goals.

10. The method of claim 1, further including arranging said computer to print or show progress of financial information selected from the group consisting of loan balance due, amount received to date, and investor's loan projected payoff date.

11. A system for generating predictable additional income for an investor having a first income, comprising:
    a computer having a plurality of input and output components selected from the group consisting of displays, keyboards, mice, modems, and printers,
    said computer further including updatable memory selected from the group consisting of random-access or read-and-write memory, read-only memory, flash memory, and a hard memory disk, and
    a program operable in said computer,
    said program being arranged to receive information from said investor and cause said computer to display results on said input and output components and to store information in said memory,
    a revolving line-of-credit account obtained from a lender with the ability to supply funds, wherein said lender charges interest on the average daily balance of funds withdrawn from said line-of-credit account,
    a withdraw-on-demand account,
    an income-producing investment that is purchased with a lump sum withdrawn from said line-of-credit account and that is arranged to produce a second income for said investor and is used to purchase an income-producing asset for said investor,
    said computer being programmed so that when said first and said second incomes, said living expenses, the amount of said investment, and the interest rate of said line-of-credit are entered into said computer by said investor, said program computes the sum of said first and second incomes and causes said computer to display to said investor the amount and timing to sweep funds from said sum (a) into said line-of-credit account to repay said lump sum withdrawn, and (b) to pay said living expenses,
    thereby generating a predictable additional income for said investor by timing the sweeping of said funds into and out of said line-of-credit account in order to minimize the average daily balance on said line-of-credit and reduce the amount of interest paid.

12. The system of claim 11 wherein said investor is selected from the group consisting of investors and financial managers.

13. The system of claim 11 wherein at least one of said combining, said sweeping of said combined income into said line-of-credit account, said sweeping of said funds into said checking account, and said paying of said living expenses is automated by said computer.

14. A method for generating predictable income, comprising:
    obtaining at least one of each type of account selected from the group consisting of revolving line-of-credit and withdrawal-on-demand accounts,
    funding said line-of-credit account with a predetermined amount of funds borrowable at a predetermined rate of interest wherein the amount of interest due each month is based on the average daily balance borrowed,
    making a lump-sum purchase of a first income-producing investment using said funds from said revolving line-of-credit account,
    providing an investor having living expenses and an income in excess of said living expenses,
    depositing said income from said income-producing investment into said withdrawal-on-demand account,
    depositing said income in excess of living expenses from said investor into said withdrawal-on-demand account,
    providing a computer having a data input, a data output, a storage capability, and capable of running a program, said program being arranged to:
        (a) combine said income from said income-producing investment and said income of said investor,
        (b) periodically direct said investor to sweep money from said withdrawal-on-demand account into said line-of-credit account and then compute the balance in the line-of-credit account,
        (c) periodically pay said living expenses of said investor,
        (d) display financial information selected from the group consisting of said balance in said line-of-credit account, said balance in said withdraw-on-demand account, said lump sum purchase amount, said income of said investor, actions to be taken by said investor, and said income from said income-producing investment,
    whereby when there is a balance in said withdrawal-on-demand account, said program directs said investor to sweep funds from said withdrawal-on-demand account into said line-of-credit account, said investor can view all of said financial information and if said line-of-credit account balance repaid or nearly repaid, said investor can optionally use said money in said line-of-credit account to make a lump-sum purchase of a second income-producing investment and combine said income from said first investment and said second investment with said income of said investor in order to pay down said line-of-credit at a more rapid rate.

15. The method of claim 14 wherein said displaying of said financial information is provided at times selected from the group consisting of periodically and on demand.

16. The method of claim 14, further including:
    obtaining a credit card account having no interest charges when paid in full each month, charging a portion of said living expenses to said credit card account in order to leave as much of said funds in said balance of said funds in said line-of-credit account, paying said credit card account in full each month, whereby said portion of said living expenses are floated on said credit card account, thereby reducing said daily balance of said line-of-credit account and said amount of said interest paid.

17. The method of claim 14 wherein said computer is arranged to pay said living expenses of said investor as late as possible each month and direct said investor to sweep money from said withdrawal-on-demand account into said line-of-credit account as early as possible each month.

18. The method of claim 14 wherein said investor is selected from the group consisting of individual investors and financial managers.

19. The method of claim 14 wherein at least one of said depositing of said income from said income-producing investment into said withdrawal-on-demand account, said depositing of said income in excess of living expenses from said investor into said withdrawal-on-demand account, said combining of said incomes, and said sweeping of said combined income into said line-of-credit account is automated by said computer.

* * * * *